United States Patent

[11] 3,570,382

[72] Inventors Karl Neudecker
Munich;
Johann Zanner, Unterhaching; Anton
Theer, Munich, Germany
[21] Appl. No. 757,674
[22] Filed Sept. 5, 1968
[45] Patented Mar. 16, 1971
[73] Assignee AGFA-Gevaert Aktiengesellschaft
Leverkusen, Germany
[32] Priority Sept. 9, 1967
[33] Germany
[31] A28356

[54] PHOTOGRAPHIC CAMERA WITH FILM TYPE INDICATING MEANS
22 Claims, 3 Drawing Figs.

[52] U.S. Cl.................................................. 95/11, 352/72
[51] Int. Cl...................................................... G03b 17/20
[50] Field of Search........................................... 95/11, 31; 352/72, 78

[56] References Cited
UNITED STATES PATENTS
3,120,781 2/1964 Babcock et al. ............... 352/72
3,395,630 8/1968 Haufler et al. ................. 95/11
3,421,422 1/1969 Winkler......................... 95/11
3,444,798 5/1969 Mayr et al..................... 352/72X Primary Examiner—John M. Horan
Assistant Examiner—Fred L. Braun
Attorney—Michael S. Striker ABSTRACT: A photographic camera which utilizes magazines provided with coding marks indicating the film type therein has a movable detector which can be engaged by the coding mark of that magazine which is inserted into the camera to thereby move one of several light-transmitting flags into the view finder window. The color and/or other characteristics of each flag are representative of a particular film type. The detector is further movable by a pusher which is caused to change its position in response to attachment of an illuminating arrangement.

Patented March 16, 1971

3,570,382

INVENTOR.

KARL NEUDECKER
JOHANN ZANNER
ANTON THEER

BY Michael S. Striker
Attorney

PHOTOGRAPHIC CAMERA WITH FILM TYPE INDICATING MEANS

The present invention relates to photographic cameras in general, and more particularly to improvements in means for indicating to the user of a motion picture camera or still camera the type of film which is accommodated in the camera body. Still more particularly, the invention relates to improvements in film type indicating means in cameras which utilize film magazines, cassettes or cartridges provided with coding marks to point out the type of film therein. The improved indicating means can indicate the length and/or other characteristics of film in a magazine or the like.

It is already known to provide a camera which can utilize films of different length with counters or indicators which can point out the length of film on a spool. Such cameras are provided with a shiftable window and with several scales each of which is indicative of a film of different length. When a spool containing a certain length of film is inserted into the camera body, the window is caused to conceal all but a single scale, namely, that scale which indicates the length of film on the inserted spool. A drawback of such proposal is that the camera must be provided with several scales and that the window must be shifted through considerable distances. Therefore, the just described conventional indicating devices cannot be readily accommodated in relatively small cameras.

It is also known to provide a camera with two or more permanently observable symbols and to install in the camera a pointer or index which moves into registry with a particular symbol when the camera body receives a particular type of film, for example, daylight film or artificial-light film. The magazines containing such film are provided with coding marks which cause appropriate displacement of the index. A drawback of this proposal is that all of the symbols are visible at all times so that the operator of the camera must carefully examine the position of the index.

SUMMARY OF THE INVENTION

An object of our present invention is to provide a motion picture camera or still camera with simple, reliable and compact means for indicating various film types in such a way that the operator can determine the type of film which is accommodated in the camera by utilizing the camera in the customary way.

Another object of the invention is to simplify the construction of indicating means in cameras utilizing magazines provided with coding marks which indicate the film type therein.

A further object of the invention is to provide a camera wherein the indicating means further informs the operator whether or not an artificial-light film is ready to be used in daylight or whether the camera must be used with a flash unit or another illuminating arrangement.

An additional object of the invention is to provide a camera wherein the indications representing various film types can be observed by looking through the view finder.

Still another object of the invention is to provide a simple detector which can scan the coding marks of magazines and is capable of placing proper indicators into the field of view of the view finder.

A concomitant object of the invention is to provide a detector which can also move a customary conversion filter enabling the operator to use artificial-light film in daylight.

The improved camera is intended for use with magazines containing at least two different types of film and provided with coding means indicative of the film type therein. The camera comprises a view finder having window means which may include a single window or several windows, and movable detector means (which may include one or more levers and/or slides) engageable by a coding means in response to insertion of the corresponding magazine into the camera whereby such coding means effects movement of the detector means into that one of a plurality of positions which is indicative of the respective film type. The detector means is provided with a plurality of indicators (e.g., flags of light-transmitting material), at least one for each film type, and positioned on the detector means in such a way that the indicator representing a particular film type is observable in the window means when the detector means assumes the corresponding position.

The improved arrangement is particularly suited for use in cameras which employ magazines with two types of coding means. One such type of coding means comprises a notch in a panel of the magazine and the other coding means is without a notch. A spring is preferably provided to bias the detector means against the coding means of the magazine which is inserted into the camera.

If desired, the detector means may carry a conversion filter which can be moved across or away from the optical axis of the objective in response to attachment or separation of an electronic flash or another illuminating arrangement from the housing of the camera. Such conversion filter renders it possible to use artificial-light film in daylight.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
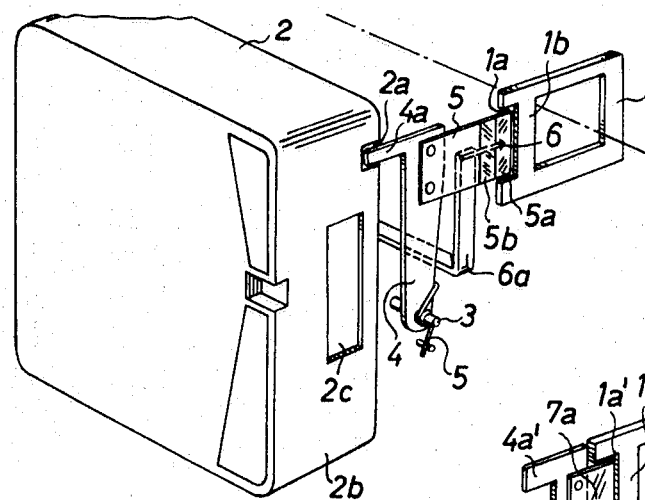
FIG. 1 is a fragmentary perspective view of a photographic camera which embodies one form of the invention.

FIG. 1 illustrates a portion of a motion picture camera which includes a view finder having a rectangular frame 1. The camera can be used with magazines or cassettes 2 for 8-millimeter film. Such magazines may contain artificial-light film or daylight film and are provided with coding means or marks to indicate the respective type of film. Alternatively, the magazines 2 may contain normal film of lesser length or thin film of greater length. In each of the first instances (artificial-light film or normal film), the front panel 2b of the corresponding magazine 2 is provided with a coding notch or mark 2a at a level above the film window 2c. In each of the second instances (daylight film or thin film), the magazine is provided with a mark (not shown) which is simply a portion of the surface on the front panel 2b, i.e., the notch 2a is then omitted.

The camera further comprises simple means for indicating the type of film in that magazine which is inserted into the housing or body of the camera. To this end, the frame 1 of the view finder comprises a U-shaped portion which defines an elongated recess or window 1a visible to the person looking through the view finder. A movable scanning member or detector 4 (here shown as a lever) is pivotable about the axis of a horizontal pin 3 and is biased by a torsion spring 3a which tends to turn it in a counterclockwise direction so that its projection or lug 4a extends into the coding notch or mark 2a of the magazine 2. The detector 4 carries a plate 5 which is provided with two indicators or flags 5a, 5b, e.g., two differently colored light-transmitting foils or strips of rectangular outline. Since the lug 4a extends into the coding notch 2a, the detector 4 is held in an angular position in which the flag 5a (indicating artificial-light film or normal length film) registers with the window 1a of the frame 1 and is visible to the person looking through the view finder. If the magazine 2 is replaced by a magazine for daylight film or thin film, i.e., by a magazine which does not have a notch and whose coding mark constitutes a portion of the surface of the front panel 2b, the spring 3a is caused to store energy in response to insertion of such magazine and the detector 4 assumes an angular position in which the other flag 5b registers with the window 1a. The flag 5a is then concealed behind a vertically extending opaque portion 1b of the frame 1. If the camera is to further indicate the length of film accommodated in the magazine which has been inserted into the camera housing, the flags 5a, 5b may be provided with suitable scales which are graduated to indicate various film lengths and the frame counter of the camera then comprises an extension or arm 6a having an index 6 which is in registry with the window 1a and pinpoints that graduation on the scale of the flag 5a or 5b which indicates the respective film length.

An advantage of the structure shown in FIG. 1 is that only one of the flags 5a, 5b can be seen in the view finder. Thus, the user of the camera need not discriminate between several flags because the flag 5a is automatically concealed when the flag 5b is observable and vice versa.

Figure 2:
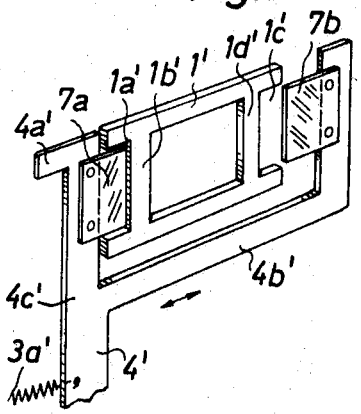
FIG. 2 is a perspective view of a detail in a second camera.

FIG. 2 illustrates a portion of a slightly modified photographic camera. The pivotable detector 4 of FIG. 1 is replaced by a slidelike reciprocable detector 4' which comprises branches or portions 4c', 4b' for two spaced flags 7a, 7b respectively corresponding to the flags 5b, 5a. The frame 1' of the view finder has two recesses or windows 1a', 1c' and two opaque portions 1b', 1d'. The portions 4c', 4b' flank the frame 1' (i.e., that part of the view finder which permits observation of a scene or subject) and the detector 4' is biased by a spring 3a' which urges its lug 4a' into the coding notch 2a (not shown in FIG. 2) or against the outer surface on the front panel 2b of a magazine in the camera. If there is a coding notch, the flag 7a is moved away from the registry with the window 1a' but the flag 7b then registers with the window 1c'. If the magazine does not have a coding notch, the flags 7a, 7b assume the positions shown in FIG. 2.

The main difference between the embodiments of FIGS. 1 and 2 is that the one-piece window 1a is replaced by a two-piece window 1a', c' and that the flags 7a, 7b are not adjacent to each other. These flags preferably consist of differently colored light-transmitting material. It is clear that each of the flags may be provided with indicia pointing out in more detail the type of the corresponding film. Thus, the flag 7b which indicates artificial-light film may be provided with the representation of a flash bulb or with a thunderbolt symbol, and the flag 7a which indicates daylight film may be provided with a sun or with the letter D. If the flags 7a, 7b are to further indicate the length of corresponding film types, or if such flags are to indicate only the length of the corresponding film types, they may be provided with graduated scales in the same way as described in connection with FIG. 1. The frame counter then comprises an index which can pinpoint an appropriate graduation on the scale of the flag 7a or 7b.

Figure 3:
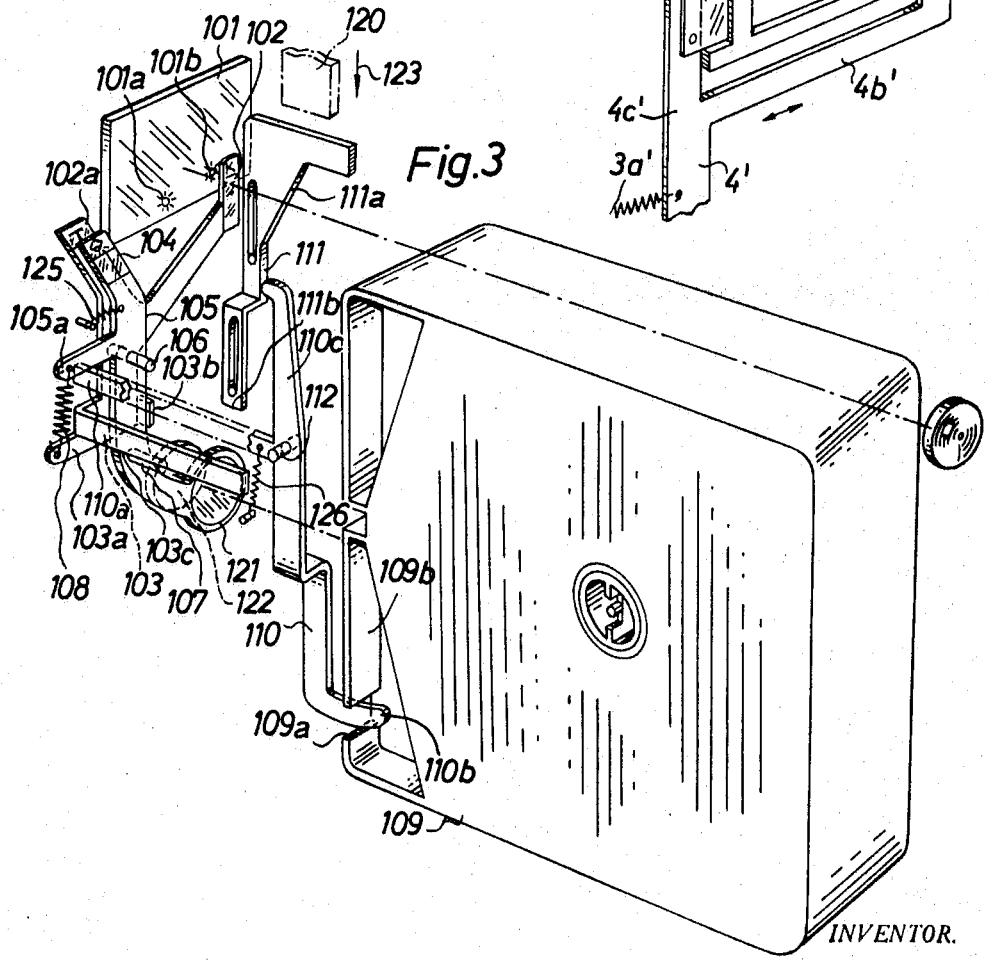
FIG. 3 is a fragmentary perspective view of a third camera.

Referring finally to FIG. 3, there is shown a portion of a third photographic camera which employs magazines or cassettes 109 having coding means in the form of notches 109a or coding means which simply constitute portions of surfaces on the front panels 109b. The magazine 109 of FIG. 3 is assumed to contain artificial-light film which can be used in daylight if a conversion filter 121 is placed across the path of incoming scene light.

The view finder window 101 accommodates a glass plate or lens which is provided with two sun symbols 101a, 101b. A lever 103 is turnable on a pivot 106 and carries on one of its arms a light-transmitting indicator or flag 102 provided with the letter K which is indicative of artificial-light film. This letter K is visible to the person observing the view finder window 101. A second arm of the lever 103 carries a second light-transmitting indicator or flag 102a which is less transparent than the flag 102 and carries the letter T indicating daylight film. The lever 103 has three additional arms 103a, 103b, 103c the first of which is coupled to the arm 105a of a second lever 105 by a resilient element here shown as a helical spring 108 which tends to turn the lever 103 in a clockwise direction and the lever 105 in a counterclockwise direction. The spring 108 also causes the arm 103b to bear against the lever 105 and it further causes the lever 105 to bear against a fixed stop 107. In the illustrated position of the lever 103, the flag 102 over lies the sun symbol 101b on the plate in the view finder window 101. The lever 105 is pivotable on the aforementioned pin 106. A further pivot pin 112 is provided in the housing of the camera for a third lever 110 having a projection or lug 110b corresponding to the lug 2a of FIG. 2a and adapted to enter the notch 109a of the magazine 109. The lever 110 comprises a second projection or arm 110a which then abuts against the arm 105a of the lever 105. A displacing member or pusher 111 is mounted in the housing of the camera for vertical reciprocatory movement and is biased upwardly by a spring, not shown. This pusher 111 can be shifted downwardly by a suitable key 120 when the latter is inserted into a slot in the top wall of the camera housing, or by a leg of an illuminating arrangement, e.g., an electronic flash which can be coupled to the camera for making exposures indoors. The direction in which the key 120 or the illuminating arrangement can displace the pusher 111 is indicated by arrow 123. This pusher 111 has a cam face 111a which can engage an arm 110c of the lever 110 and a lower end portion 111b which can engage the arm 103c of the lever 103 to hold this lever against pivotal movement. In the illustrated upper end position, the pusher 111 is idle, i.e., it does not influence the position of the lever 110.

A person looking through the view finder window 101 sees the sun symbol 101a and the letter K on the flag 102. This indicates that the camera contains a magazine 109 with artificial-light film and that the camera is ready to make exposures in daylight. The conversion filter 121 on the lever 105 extends across the path of light between the objective 122 and the film window in the front panel 109b of the magazine.

If the user thereupon desires to make one or more exposures in artificial light, an illuminating arrangement (e.g., an electronic flash) is attached to the camera housing in such a way that a portion of the electronic flash enters the aforementioned slot in the top wall of the housing and moves downwardly (arrow 123) so as to shift the pusher 111. The latter's cam face 111a engages the upper arm 110c of the lever 110 and causes this lever to turn on the pivot pin 112 in a clockwise direction so that the lug 110b is withdrawn from the coding notch 109a. The arm 110a bears against the arm 105a whereby the lever 105 turns about the pin 106 in a clockwise direction and moves a preferably colored light-transmitting flag 104 into the field of view of the view finder. The flag 104 is provided with a symbol which indicates artificial illumination, for example, with the representation of a flash bulb or the like. The flag 104 then overlies the sun symbol 101a. The lower end portion 111b of the pusher 111 bears against the arm 103c of the lever 103 to hold this lever against rotation so that the flag 102 remains in front of the sun symbol 101b on the window 101 to indicate that the magazine 109 contains artificial-light film. Thus, the user can immediately learn that the magazine 109 contains artificial-light film (this is indicated by the letter K on the flag 102) and that the camera is ready to make exposures in artificial light (indicated by the representation of flash bulb on the flag 104). The conversion filter 121 has been moved away from the path of light between the objective 122 and film in the magazine 109.

When the magazine 109 is replaced with a magazine for daylight film, i.e., with a magazine whose front panel 109b does not have a coding notch 109a, the lever 110 is pivoted in a clockwise direction in response to insertion of the magazine and its arm 110a displaces the arm 105a of the lever 105. The lever 105 pivots the lever 103 about the axis of the pin 106 (in a clockwise direction) by way of the spring 108 so that the flag 102a moves in front of the window 101 and the flag 102 disappears from the field of view. The operator then knows that the camera contains daylight film (by observing the letter T on the flag 102a) and that the camera is ready to make exposures in daylight (because the sun symbol 101b is visible). The flag 102a then overlies the sun symbol 101a. The flag 104 remains in registry with the window 101 but cannot be seen by the user because it is shorter than the flag 102a. The latter has an opaque portion which conceals the flag 104 when the letter T lies in front of the sun symbol 101a. A spring 125 biases the lever 105 in a clockwise direction. The levers 103, 105, 110 constitute three movable members of a composite (three-piece) detector which carries three flags 102, 102a, 104. A further spring 126 biases the lever 110 in a counterclockwise direction to thus urge the projection 110b into the coding notch 109a.

The cameras of FIGS. 1, 2 and 3 share the common feature that a detector (4 or 4' or 103, 105, 110) supports at least two different indicators. The detector may be a single lever, a single slide, or it may comprise several levers and/or slides and is displaced in response to insertion of a magazine which contains one type of film to thereby place the corresponding indicator into registry with the view finder window. The displacement of the detector in response to insertion of a magazine containing a first type of film may be zero but the displacement exceeds zero if the camera housing receives a magazine containing a second type of film.

We claim:

1. In a photographic camera for use with magazines containing at least two different types of film and provided with coding means indicative of the film type therein, a combination comprising a view finder having window means; and movable detector means including a first part engageable by a coding means in response to insertion of the corresponding magazine into the camera whereby such coding means effects movement of said detector means into that one of a plurality of positions which is indicative of the respective film type, said detector means including a second part rigid with said first part and provided with a plurality of indicators, one for each of said film types, and positioned on said second part in such a way that the indicator representing a particular film type is observable in said window means when the detector means assumes the corresponding position in which said first part engages with the coding means on the inserted magazine.

2. A combination as defined in claim 1 wherein said indicators consist at least in part of light-transmitting material.

3. A combination as defined in claim 1, wherein said parts of said detector means constitute a lever which is pivotable between said positions thereof.

4. A combination as defined in claim 1, wherein said detector means is a slide which is reciprocable between said positions thereof.

5. A combination as defined in claim 1, wherein the coding means on magazines containing one of said film types comprises notches provided in such magazines and the coding means on magazines containing another film type is without notches.

6. A combination as defined in claim 1, further comprising means for biasing said first part of said detector means against the coding means of that magazine which is inserted into the camera.

7. A combination as defined in claim 6, wherein said window means comprises a single window and said indicators are closely adjacent to each other.

8. A combination as defined in claim 7, wherein said view finder further comprises an opaque portion which conceals one of said indicators when the other indicator is observable in said single window.

9. A combination as defined in claim 1, wherein said window means comprises two windows and said indicators include a pair of indicators which are remote from each other, one of said indicators being observable in one of said windows when the other indicator is away from registry with the other window, and vice versa.

10. A combination as defined in claim 9, wherein said second part of said detector means comprises two portions which flank said window means and wherein each portion of said second part carries one of said pair of indicators.

11. A combination as defined in claim 9, wherein said view finder comprises a portion located between said windows and permitting observation of the scene or subject.

12. A combination as defined in claim 1, wherein one of said film types is daylight film and another of said film types is artificial-light film.

13. A combination as defined in claim 1, wherein the length of one of said film types exceeds the length of another film type.

14. A combination as defined in claim 1, further comprising objective means, and conversion filter means movable across and away from the optical axis of said objective means in response to movement of said detector means to two different positions.

15. In a photographic camera for use with magazines containing at least two different types of film and provided with coding means indicative of the film type therein, a combination comprising a view finder having window means; movable detector means engageable by a coding means in response to insertion of the corresponding magazine into the camera whereby such coding means effects movement of said detector means into that one of a plurality of positions which is indicative of the respective film type, said detector means having a plurality of indicators, one for each of said film types, and positioned thereon in such a way that the indicator representing a particular film type is observable in said window means when the detector means assumes the corresponding position, said detector means comprising a first member having two portions each of which carries one of said indicators, a second member arranged to engage with the coding means of the magazine which is inserted into the camera, and means for biasing one of said members against the other member; and a pair of similar symbols provided in said window means, each of said symbols being overlapped by one of said indicators when the respective indicator is observable in said window means.

16. A combination as defined in claim 15, wherein said detector means further comprises a third member supporting a third indicator, resilient means coupling said third member to said first member, and further comprising displacing means for effecting movement of said third member with reference to said first member to thereby place said third indicator into overlapping position with one of said symbols in one position of said detector means.

17. A combination as defined in claim 14, wherein one indicator on said first member overlies said third indicator in another position of said detector means.

18. A combination as defined in claim 16, wherein said displacing means is arranged to move said third member with reference to said first member in response to placing of an illuminating arrangement into operative position with reference to the camera.

19. A combination as defined in claim 16, wherein said resilient means is arranged to bias said third member against a portion of said second chamber.

20. A combination as defined in claim 16, wherein said displacing means comprises means for moving said second member from a first to a second position respectively corresponding to two different positions of said detector means.

21. A combination as defined in claim 20, wherein said displacing means further comprises means for holding said first member against movement during movement of said second member from first to second position.

22. A combination as defined in claim 21, wherein said displacing means is arranged to move said second member from first to second position and to hold said first member against movement only in response to attachment of an illuminating arrangement to the camera.